(12) United States Patent
Shintani (10) Patent No.: US 10,797,278 B2
(45) Date of Patent: Oct. 6, 2020

(54) ELECTRONIC DEVICE

(71) Applicant: SEIKO EPSON CORPORATION, Tokyo (JP)

(72) Inventor: Akihiro Shintani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 247 days.

(21) Appl. No.: 15/549,947

(22) PCT Filed: Jan. 8, 2016

(86) PCT No.: PCT/JP2016/000095
§ 371 (c)(1),
(2) Date: Aug. 9, 2017

(87) PCT Pub. No.: WO2016/129204
PCT Pub. Date: Aug. 18, 2016

(65) Prior Publication Data
US 2018/0026239 A1    Jan. 25, 2018

(30) Foreign Application Priority Data

Feb. 10, 2015 (JP) .................................. 2015-024629

(51) Int. Cl.
*H01M 2/10* (2006.01)
*B41J 29/393* (2006.01)
(Continued)

(52) U.S. Cl.
CPC ......... *H01M 2/1005* (2013.01); *B41J 3/4075* (2013.01); *B41J 29/393* (2013.01);
(Continued)

(58) Field of Classification Search
CPC .................................................. H01M 2/1027
See application file for complete search history.

(56) References Cited

U.S. PATENT DOCUMENTS 5,006,881 A    4/1991 Kodama
5,519,871 A    5/1996 Shimoda
(Continued)

FOREIGN PATENT DOCUMENTS

JP    H05-077861 U    10/1993
JP    H06-059176 A    3/1994
(Continued)

OTHER PUBLICATIONS

Extended European Search Report dated Sep. 26, 2017 in related European Appl. 16748857.6 (9 pgs.).
(Continued)

*Primary Examiner* — Stephan J Essex
(74) *Attorney, Agent, or Firm* — Oliff PLC (57) ABSTRACT

In a tape printing device including a battery housing portion, the battery housing portion includes a housing portion main body and a battery lid-which cover an opening portion of the housing portion main body, and the opening portion includes a top surface opening portion facing the bottom surface of the housing portion main body, a front surface opening portion which is formed on one peripheral wall of four peripheral walls of the housing portion main body and continues to the top surface opening portion, and reaches the bottom surface or the vicinity of the bottom surface.

15 Claims, 5 Drawing Sheets

(51) Int. Cl.
*B41J 3/407* (2006.01)
*H01M 2/20* (2006.01)

(52) U.S. Cl.
CPC ........ *H01M 2/1027* (2013.01); *H01M 2/1055* (2013.01); *H01M 2/204* (2013.01); *H01M 2220/30* (2013.01)

(56) References Cited

U.S. PATENT DOCUMENTS

| | | |
|---|---|---|
| 6,554,640 B1 | 4/2003 | Koike et al. |
| 2002/0043956 A1 | 4/2002 | Yamashita |
| 2004/0038088 A1 | 2/2004 | Suto |
| 2006/0222429 A1 | 10/2006 | Kurashina |
| 2011/0187324 A1 | 8/2011 | Tan et al. |
| 2012/0237801 A1* | 9/2012 | Tatehata ............ H01M 2/0215 429/7 |
| 2013/0194732 A1 | 8/2013 | Chiba |
| 2014/0240438 A1 | 8/2014 | Furuyama |

FOREIGN PATENT DOCUMENTS

| | | |
|---|---|---|
| JP | H06-059716 A | 3/1994 |
| JP | 08-045491 A | 2/1996 |
| JP | 08-306350 A | 11/1996 |
| JP | H10-125295 A | 5/1998 |
| JP | H11-345600 A | 12/1999 |
| JP | 2000-349875 A | 12/2000 |
| JP | 2001-024347 A | 1/2001 |
| JP | 2001-332234 A | 11/2001 |
| JP | 2003-007274 A | 1/2003 |
| JP | 2013-516957 A | 5/2013 |
| JP | 2014-167853 A | 9/2014 |
| JP | 2014-220258 A | 11/2014 |

OTHER PUBLICATIONS

International Search Report dated Feb. 9, 2016 in PCT/JP2016/000095 with English-language translation (4 pgs).

* cited by examiner

ial Problem

ELECTRONIC DEVICE

CROSS REFERENCE TO RELATED APPLICATIONS

This application is a national stage entry of International Application No. PCT/JP2016/000095 filed Jan. 8, 2016; which claims priority to Japanese Patent Application No. 2015-024629 filed on Feb. 10, 2015; the entire contents of both of which are incorporated by reference herein.

TECHNICAL FIELD

The present invention relates to an electronic device including a battery housing portion.

BACKGROUND ART

In the related art, as this type of electronic device, a label producing device (electronic device) which includes a battery accommodating portion capable of alternately accommodating a plurality of dry batteries and one rechargeable battery is known (see PTL 1).

The battery accommodating portion is configured to be capable of accommodating six dry batteries in a bale stacking pattern and is configured to be capable of accommodating the rechargeable battery in place of the dry battery so that the longitudinal direction of the rechargeable battery is orthogonal to the dry battery. The six dry batteries in the bale stacking pattern are accommodated in three rows and two stages, and a gap is provided between each row. A first recessed portion and a second recessed portion are respectively formed on a first side wall and a second side wall of the battery accommodating portion positioned in the length direction of a device main body, and a first terminal and a second terminal for a dry battery are provided in both recessed portions. On the other hand, on the two inner wall portions of the battery accommodating portion positioned in a width direction of the device main body, a leaf spring for the rechargeable battery is provided in one inner wall portion and a terminal is provided in the other wall portion. The dry batteries are mounted on the first recessed portion and the second recessed portion from above, and the rechargeable batteries are mounted inside the first recessed portion and the second recessed portion from above.

CITATION LIST

Patent Literature

PTL 1: Japanese Unexamined Patent Application Publication No. 2014-167853

SUMMARY OF INVENTION

Technical Problem

In such a battery accommodating portion of an electronic device (label producing device) of the related art, in a case of pulling out a dry battery, a finger is put into a gap between the dry batteries and is pulled out one by one. In addition, in a case of pulling out the rechargeable battery, fingers are inserted into the first recessed portion and the second recessed portion for the dry battery and the rechargeable battery is pulled out. In these cases, there is a problem that taking out the battery becomes complicated since the gap into which the finger is inserted is extremely narrow.

An object of the present invention is to provide an electronic device including a battery housing portion capable of easily performing attachment/detachment of a battery.

Solution to Problem

According to the present invention, there is provided an electronic device including a battery housing portion, in which the battery housing portion includes a housing portion main body and a lid body which cover an opening portion of the housing portion main body, in which the opening portion includes a top surface opening portion which faces a bottom surface of the housing portion main body, and a peripheral surface opening portion which is formed on one peripheral wall of four peripheral walls intersecting the bottom surface of the housing portion main body, continues to the top surface opening portion, and reaches the bottom surface or the vicinity of the bottom surface.

According to the configuration, since the peripheral surface opening portion continuing to the top surface opening portion is formed so as to reach the bottom surface or the vicinity of the bottom surface of the housing portion main body, through the peripheral surface opening portion, a finger can be easily disposed on a lower side of the housed battery and the battery can be easily detached from the housing portion main body. In other words, the peripheral surface opening portion is opened to the outside portion in a state where the lid body is removed similarly to the top surface opening portion and a complicated detachment operation such as insertion of a finger into a narrow space is not required when performing the attachment/detachment of the battery. Therefore, the attachment/detachment of the battery can be easily performed with respect to the housing portion main body.

In this case, it is preferable that the lid body include a top surface covering portion which covers the top surface opening portion and a peripheral surface covering portion which covers the peripheral surface opening portion, and the lid body open and close the opening portion in a snap-in manner.

According to the configuration, opening/closing of the lid body in the snap-in manner can be performed using the deflection (springiness) of the top surface covering portion and/or the peripheral surface opening portion. In other words, the spring stroke can be extended in the snap-in opening/closing, and the opening/closing of the lid body can be smoothly performed.

In these cases, it is preferable that the battery housing portion be configured to be capable of mounting a secondary battery and the housing portion main body include a secondary battery terminal which extracts electric power of the secondary battery mounted from a peripheral surface opening portion side.

According to the configuration, the attachment/detachment of the secondary battery can be performed without largely changing the position of a finger disposed to the secondary battery. Therefore, the attachment/detachment of the secondary battery can be easily performed with respect to the housing portion main body.

In this case, it is preferable that the housing portion main body include a guide portion which guides mounting of the secondary battery.

According to the configuration, the attachment/detachment of the secondary battery with respect to the housing portion main body can be smoothly performed without an error, by the guide portion.

In addition, it is preferable that the housing portion main body include a terminal protection portion that faces the secondary battery terminal and prevent the secondary battery from being mounted from the top surface opening portion side.

According to the configuration, the mounting of the secondary battery on the housing portion main body from an erroneous direction can be prevented in advance.

Further, it is preferable that the housing portion main body include a battery support portion that extends in the mounting direction of the secondary battery and configure a gap between the secondary battery and the bottom surface thereof.

According to the configuration, the attachment/detachment of the secondary battery can be performed while gripping an end portion thereof. Therefore, the attachment/detachment of the secondary battery can be easily performed.

In addition, it is preferable that the electronic device further include a handle portion which includes a finger insertion space facing the peripheral surface opening portion and supports the electronic device, in which a length of the finger insertion space be shorter than a length of the secondary battery in the mounting direction of the secondary battery.

According to the configuration, when the secondary battery is vigorously pulled out (detachment), the secondary battery hits the handle portion once. Therefore, the secondary battery can be prevented from being simply dropped from the housing portion main body by a force of pulling out the secondary battery. In addition, the strength reduction in the opening direction of the housing portion main body as expected by the peripheral surface opening portion can be sufficiently compensated by the handle portion.

On the other hand, it is preferable that the battery housing portion be configured to be capable of mounting a primary battery in a posture orthogonal to the mounting direction of the secondary battery in place of the secondary battery, and the housing portion main body include a primary battery terminal of the primary battery mounted from the top surface opening portion side, electric power being extracted from the primary battery terminal.

According to the configuration, in the primary battery mounted in place of the secondary battery, since the peripheral surface opening portion and the primary battery are positioned in parallel to each other, the attachment/detachment thereof can be easily performed. Particularly, in a case where a plurality of primary batteries are mounted, the plurality of primary batteries can be detached all together using the peripheral surface opening portion.

In this case, it is preferable that the length of the secondary battery in the direction intersecting the mounting direction be formed to be shorter than the length in the mounting direction of the primary battery, the primary battery terminal be provided on the other two peripheral walls intersecting one peripheral wall, and a protective partition wall which protects the primary battery terminal protrude from the other two peripheral walls spaced by the width of the secondary battery.

According to the configuration, damage to the primary battery terminal can be effectively prevented when performing the attachment/detachment of the secondary battery without the primary battery terminal being interfered with the secondary battery at the time of the attachment/detachment thereof by the protective partition wall. In addition, the protective partition wall can also function as a guide in the attachment/detachment of the secondary battery.

In this case, it is preferable that a positive side terminal of the primary battery terminal be provided in a shallow groove recessed in another peripheral wall.

According to the configuration, in a case where the primary battery is mounted with an erroneous polarity, short circuit of the primary battery can be prevented without a negative electrode of the primary battery and the positive side terminal of the primary battery terminal being electrically connected to each other.

In addition, it is preferable that the electronic device further include a printing portion which prints on a printing tape, in which the printing portion be held and operated.

According to the configuration, since the battery housing portion which can easily perform the attachment/detachment of the battery is included, handling properties can be improved.

DESCRIPTION OF EMBODIMENTS

Hereinafter, a case where an electronic device according to an embodiment of the present invention is applied to a tape printing device will be described with reference to the accompanying drawings. This tape printing device, for example, produces a label for displaying a cable system in a terminal block and is formed in a small and vertically long shape so that it can be held and be operated at a work site. In the tape printing device, a tape cartridge having a printing tape is mounted in an attachable/detachable manner, and the tape printing device performs printing while feeding out the printing tape from the tape cartridge, cuts off the printed portion of the printing tape, and produces a label.

[Overall Configuration of Tape Printing Device]

Figure 1:
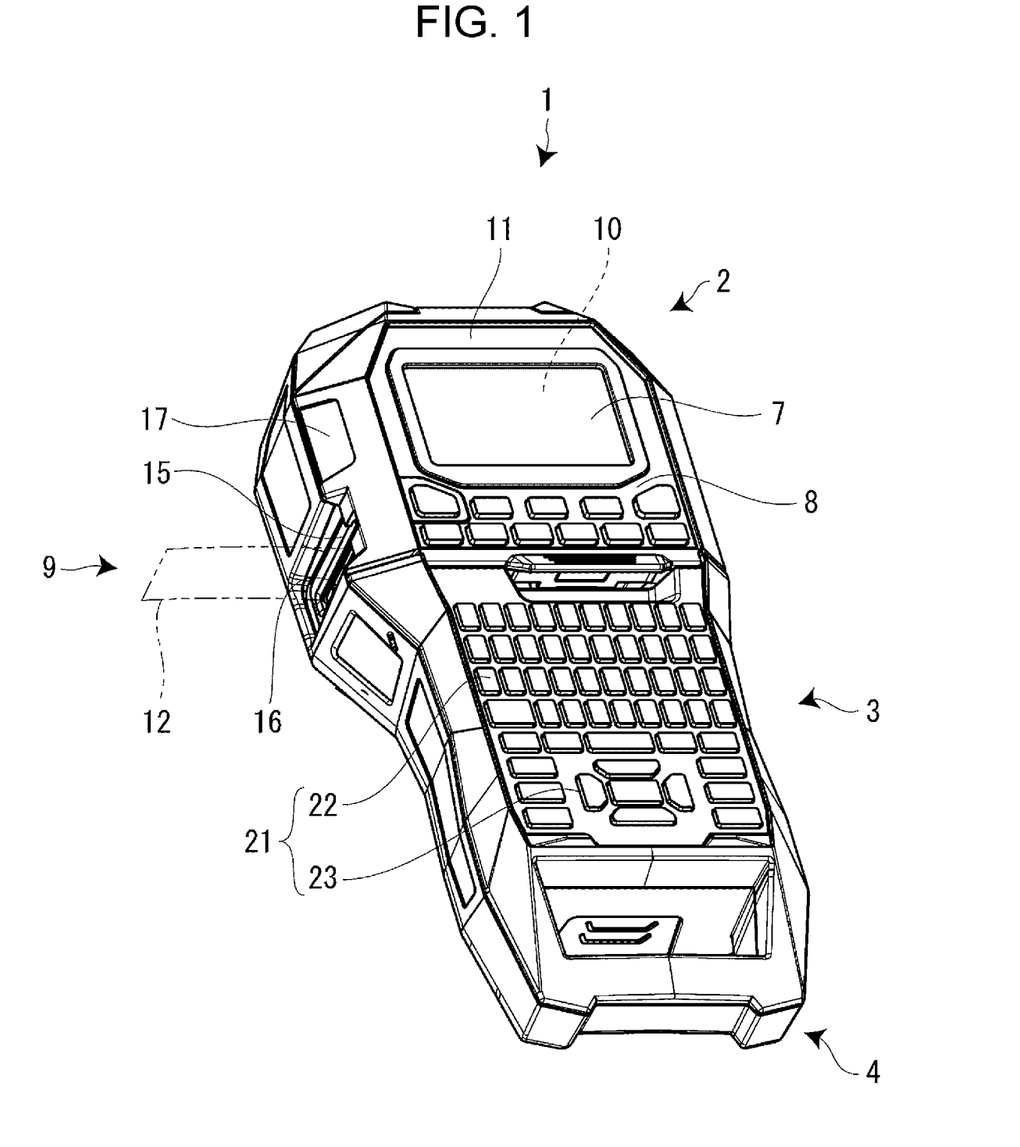
FIG. 1 is an external perspective view of a tape printing device according to an embodiment as viewed obliquely from above.
Figure 2:
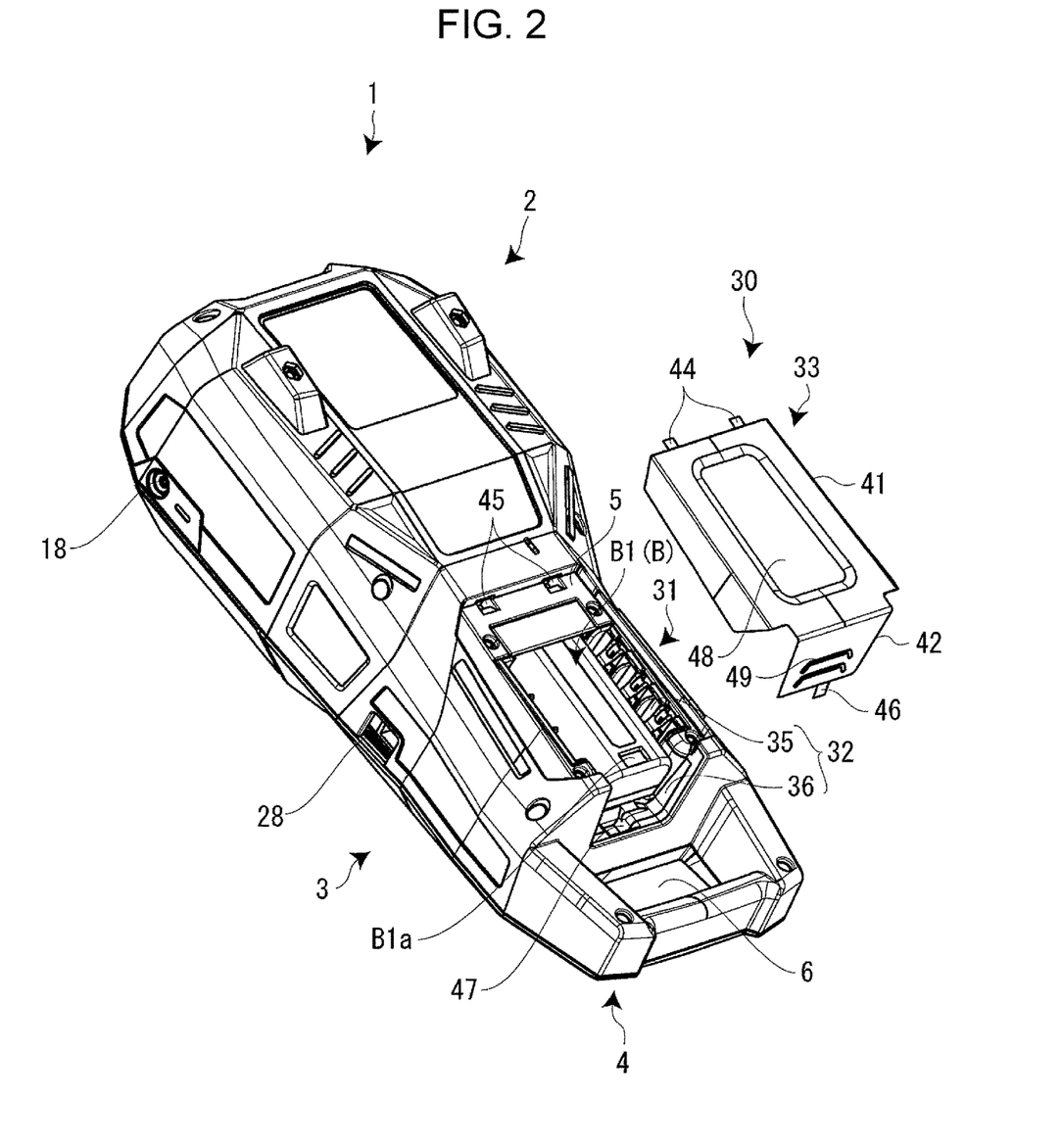
FIG. 2 is an external perspective view of the tape printing device according to the embodiment as viewed obliquely from below.
Figure 3:
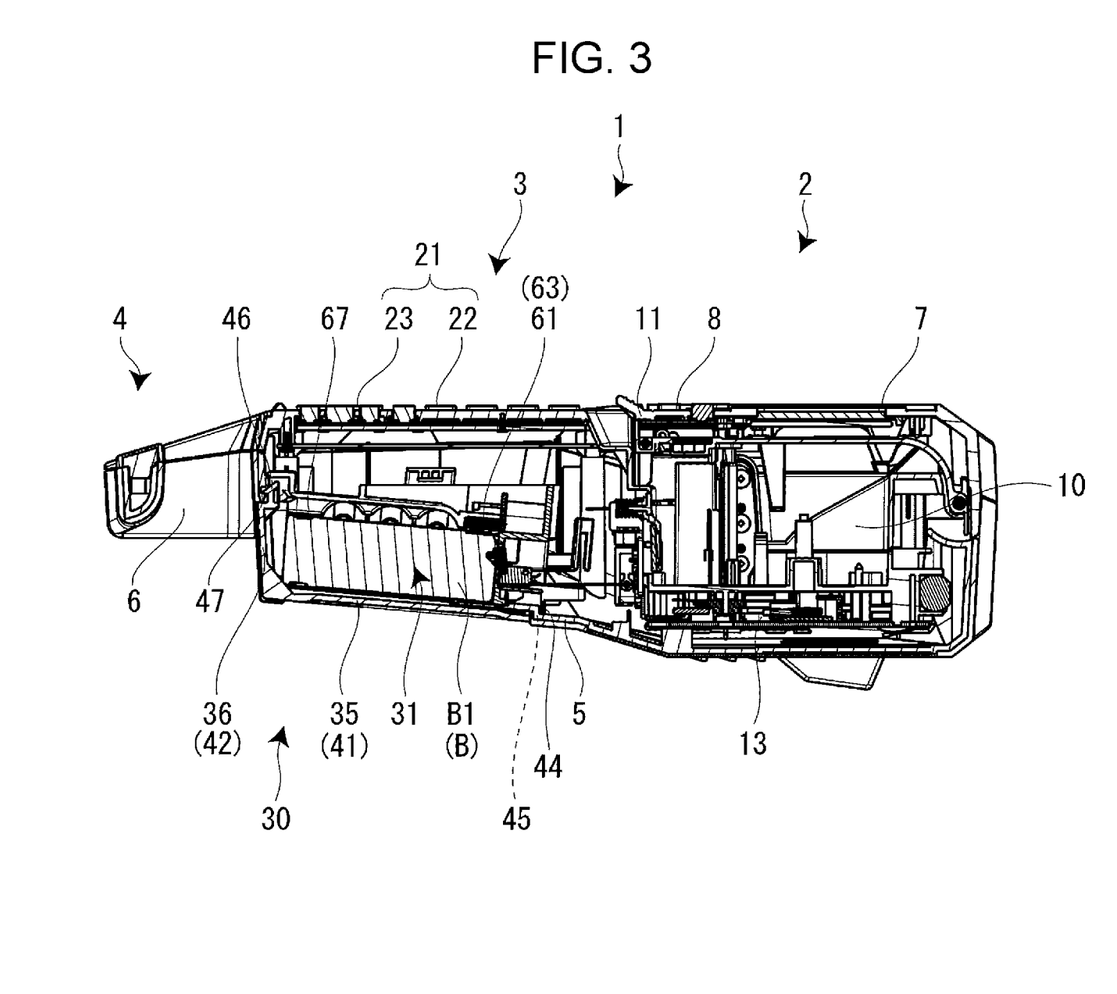
FIG. 3 is a longitudinal sectional view of the tape printing device according to the embodiment.

FIG. 1 is an external perspective view of a tape printing device as viewed obliquely from above, FIG. 2 is an external perspective view of the tape printing device as viewed obliquely from below, and FIG. 3 is a longitudinal sectional view of the tape printing device. As illustrated in these drawings, the tape printing device 1 is vertically long and is formed integrally with a main mechanism portion 2 on a tip side thereof, which is formed to be thick and wide, a handling portion 3 which is connected to a proximal end side of the main mechanism portion 2 and is formed to be thin and narrow by the main mechanism portion 2, and a handle portion 4 which is connected to the proximal end side of the handling portion 3. The tape printing device 1 formed to be vertically long is held and operated with one hand or both hands by the handling portion 3. In addition, the tape printing device 1 is carried using the handle portion 4.

On a front side of the main mechanism portion 2, a display portion 7 is widely provided, and a secondary keyboard portion 8 is provided adjacent to the display portion 7. In addition, a cartridge mounting portion 10 for mounting a tape cartridge 9 in an attachable/detachable manner is formed in a recessed manner and an opening/closing lid 11 for opening and closing the cartridge mounting portion 10 is provided on the main mechanism portion 2 (see FIG. 3). In the present embodiment, the display portion 7 and the secondary keyboard portion 8 are provided on the front side of the opening/closing lid 11. In addition, around the cartridge mounting portion 10, a printing portion 13 for feeding out a printing tape 12 from the tape cartridge 9 and performing printing on the printing tape 12 is incorporated (see FIG. 3).

On a left side surface of the main mechanism portion 2, a tape discharge port 15 from which the printed portion of the printing tape 12 by the printing portion 13 is discharged is provided. In addition, a cutter 16 for cutting off the printed portion of the printing tape 12 is incorporated between the tape discharge port 15 and the cartridge mounting portion 10 (see FIG. 1). Further, in the vicinity of the tape discharge port 15, a viewing window 17 is provided for viewing the tape cartridge 9 mounted on the cartridge mounting portion 10. On the other hand, a power source connector 18 is provided on a right side surface of the main mechanism portion 2 (see FIG. 2).

On a front side of the handling portion 3, a main keyboard portion 21 in which a letter key 22, a cursor key 23, or the like are disposed is provided (see FIG. 1). In addition, a battery housing portion 30 in which a battery which is a power source is housed is disposed on the back side of the handling portion 3. Further, a USB connector 28 is provided on a right side surface of the handling portion 3 (see FIG. 2).

Next, an overview of the battery housing portion 30 will be described with reference to FIGS. 2 and 3 and the details of the battery housing portion 30 will be described with reference to FIGS. 4 and 5. In the following description, an upper side in the drawing is referred to as "upper" and a lower side is referred to as "lower" following these drawings. In addition, a right side in the drawing is referred to as "right", a left side is referred to as "left", a near side is referred to as "front surface", and a far side is referred to as "rear surface".

[Overview of Battery Housing Portion]

As illustrated in FIGS. 2 and 3, the battery housing portion 30 includes a housing portion main body 31 for housing a battery B and a battery lid 33 (lid body) for covering an opening portion 32 of the housing portion main body 31 in an openable/closable manner. The opening portion 32 has a top surface opening portion 35 on an upper side and a front surface opening portion 36 (peripheral surface opening portion) on a near side, and the battery lid 33 is formed in a shape according to the top surface opening portion 35 and the front surface opening portion 36.

Although a rechargeable battery B1, which is a secondary battery, is always mounted on the housing portion main body 31 in an attachable/detachable manner, in place of the rechargeable battery B1, a plurality of (six in this embodiment) dry batteries B2, which are primary batteries, are also configured in an attachable/detachable manner (see FIG. 5). In other words, although the tape printing device 1 of the present embodiment uses the rechargeable battery B1 as a power source, in a case where the battery exhaustion of the rechargeable battery B1 at the work site, or the like is generated, the tape printing device can be driven by the dry battery B2. With respect to the housing portion main body 31, the rechargeable battery B1 is mounted from the front surface opening portion 36 which is a near side and the six dry batteries B2 are mounted from the top surface opening portion 35 which is an upper side. In other words, the rechargeable battery B1 is attached and detached in a sliding manner in a far direction, and the six dry batteries B2 are attached and detached in a vertical direction intersecting the far direction.

The battery lid 33 is integrally formed in a section "L" shape with a top surface covering portion 41 for covering the top surface opening portion 35 and a front surface covering portion 42 (peripheral surface covering portion) for covering the front surface opening portion 36. A pair of locking protrusions 44 is provided on a far side outer end portion of the top surface covering portion 41 and the pair of locking protrusions 44 is locked to a pair of locking holes 45 formed on the device case 5. Similarly, a downward hook piece 46 is provided at a near side outer end portion of the front surface covering portion 42 and the hook piece 46 is locked to a hook receiver 47 formed on the device case 5 (See FIG. 3).

The battery lid 33 is opened and closed by engaging and disengaging the hook piece 46 with the hook receiver 47 in a state where the pair of locking protrusions 44 is locked to the pair of locking holes 45. In other words, the battery lid 33 is opened and closed in a snap-in manner with respect to the housing portion main body 31. The housing portion main body 31 is screwed to the device case 5 at four locations. In addition, on the surface of the top surface covering portion 41, a rectangular shallow groove portion 48 which prevents slip thereof when the handling portion 3 is held is formed. Similarly, when the battery lid 33 is opened and closed, a finger hook portion 49 for hooking a finger is formed on the surface of the front surface covering portion 42.

On the other hand, the rechargeable battery B1 is configured by, for example, a lithium ion battery. On a rear surface of the tip portion of the rechargeable battery B1, electrodes are provided so as to be exposed. A pair of guide grooves for guiding the attachment/detachment of the rechargeable battery B1 is provided on both side surfaces of the tip portion (none of these are illustrated). In addition, a finger hook groove B1a for gripping the rechargeable battery B1 is formed on the surface of the proximal end portion of the rechargeable battery B1. As will be described in detail later, the rechargeable battery B1 can be gripped by both the front and rear surfaces of the proximal end portion when performing the attachment/detachment.

[Details of Battery Housing Portion]

As illustrated in FIGS. 4 and 5, the housing portion main body 31 has left and right side wall portions 51, a bottom wall portion 52 passes between the lower ends of the both side wall portions 51 and a far wall portion 53 on the rear surface side. Both the side wall portions 51, the bottom wall portion 52, and the far wall portion 53 are formed integrally with a resin or the like and both the side wall portions 51, the bottom wall portion 52, the far wall portion 53, and the battery lid 33 constitute a housing space 54 which houses the battery B (refer to FIG. 3). The housing portion main body 31 can be configured of two members with the far wall portion 53 side being made as a separate body without complex shape.

In addition, the housing portion main body 31 includes an eaves-like plate portion 55 (terminal protection portion) provided so as to pass between the upper ends of both side wall portions 51 on the far side. The eaves-like plate portion 55 is formed integrally with both the side wall portions 51 and functions as a reinforcing material against the opening of both the side wall portions 51 and on the other hand, as will be described in detail later, erroneous mounting of the rechargeable battery B1 from the top surface opening portion 35 side is prevented. In addition, a recessed portion 57 continuing to the front surface opening portion 36 is provided at the near side end portion of the bottom wall portion 52, and in the closed state, the hook piece 46 of the battery lid 33 faces the recessed portion 57 (See FIG. 3).

As illustrated in FIG. 4, a pedestal portion 61 in which a portion of the bottom wall portion 52 is raised is provided on the far side of the housing portion main body 31. A bag-like space configured by the pedestal portion 61, both far side walls 62 of the both side wall portions 51, the far wall portion 53, and the eaves-like plate portion 55 described above is formed in a complementary shape with the tip portion of the rechargeable battery B1. On a surface of the pedestal portion 61, a rechargeable battery terminal 63 (secondary battery terminal) is provided. In addition, a pair of guide protrusions 64 (guide portions) which are engaged with the guide grooves of the rechargeable battery are provided on both the far side walls 62 of the side wall portion 51.

In a case where the rechargeable battery B1 is slid from the near side, the guide protrusion 64 engages with the guide groove of the rechargeable battery B1, and the mounting is guided. In this state, when the tip of the rechargeable battery B1 is abutted against the far wall portion 53 (complete mounting), the electrode of the rechargeable battery B1 is in contact with the rechargeable battery terminal 63 and is electrically connected. In the mounted state, although the rechargeable battery B1 receives an urging force from the rechargeable battery terminal 63 to an upper side via the electrode, this urging force is received by the guide protrusion 64 engaged with the guide groove.

The eaves-like plate portion 55 is positioned above the rechargeable battery terminal 63 so as to face each other. The eaves-like plate portion 55 functions as a baffle plate when trying to mount the rechargeable battery B1 from the upper side and prevents the rechargeable battery B1 from being mounted on the housing portion main body 31 from an erroneous direction in advance. In addition, a detection switch 65 (for example, micro switch) is provided in the center of the far wall portion 53. When the rechargeable battery B1 is completely mounted, the tip of the rechargeable battery B1 turns on the detection switch 65 and the mounting of the rechargeable battery B1 is detected.

A pair of battery support portions 67 is provided at corner portions of the side wall portion 51 and the bottom wall portion 52 on the near side of the housing portion main body 31. Similarly to the pedestal portion 61 described above, the battery support portion 67 is provided to raise a portion of the bottom wall portion 52, and a surface (upper surface) of the battery support portion 67 and a surface (upper surface) of the pedestal portion 61 are disposed at approximately the same height (see FIG. 3). A procedure of an actual mounting operation of the rechargeable battery B1 is as follows: the finger insertion space 6 between the front surface opening portion 36 and the handle portion 4 is used, the tip side of the rechargeable battery B1 is temporarily seated on both battery support portions 67 and then slide mounting is performed. In addition, the actual detachment operation of the rechargeable battery B1 is performed by the reverse procedure to the procedure of the actual mounting operation.

Figure 5A:
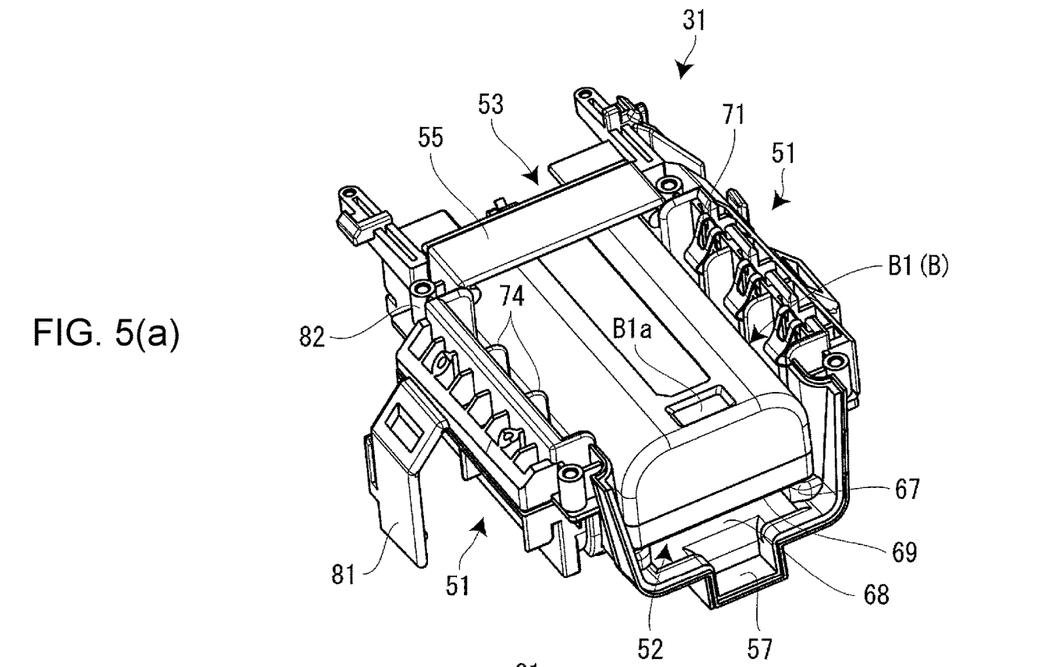
FIG. 5(a) is a perspective view of the battery housing portion in a state where a rechargeable battery is mounted and FIG. 5(b) is a perspective view of the battery housing portion in a state where a dry battery is mounted.

Both battery support portions 67 are raised with respect to the bottom surface 68 of the bottom wall portion 52 between both battery support portions 67, and a floating space 69 continuing to the recessed portion 57 is generated between the bottom surface 68 of the bottom wall portion 52 and the rechargeable battery B1 seated on the battery support portion 67 (see FIG. 5(*a*)). In other words, the rechargeable battery B1 is supported by both battery support portions 67 in a state of being floated from the bottom surface 68 of the bottom wall portion 52. Particularly, in the detachment operation of the rechargeable battery B1, although the rechargeable battery can be pulled out by placing a finger on the finger hook groove B1*a* of the rechargeable battery B1, it is preferable that the near side end portion of the rechargeable battery B1 be gripped and pulled out by using a finger disposed to the finger hook groove B1*a* and a finger inserted into the floating space.

On the other hand, the length of the finger insertion space 6 is shorter than that of the rechargeable battery B1 in the far direction (attachment/detachment direction) in order to perform the attachment/detachment operation of the rechargeable battery B1 (see FIG. 3). Accordingly, the rechargeable battery B1 can be temporarily seated on both battery support portions 67 and then the sliding mounting can be performed or the sliding detachment can be performed in the reverse procedure thereof. In addition, the guide groove and the guide protrusion 64 are also formed to have a length considering the attachment/detachment operation. However, depending on a user, it is also assumed that the rechargeable battery B1 is vigorously pulled out. In this case, the pulled-out rechargeable battery B1 hits the handle portion 4. Therefore, the rechargeable battery B1 can be prevented from being dropped from the housing portion main body 31 by the force of pulling out the rechargeable battery B1.

Figure 4A:
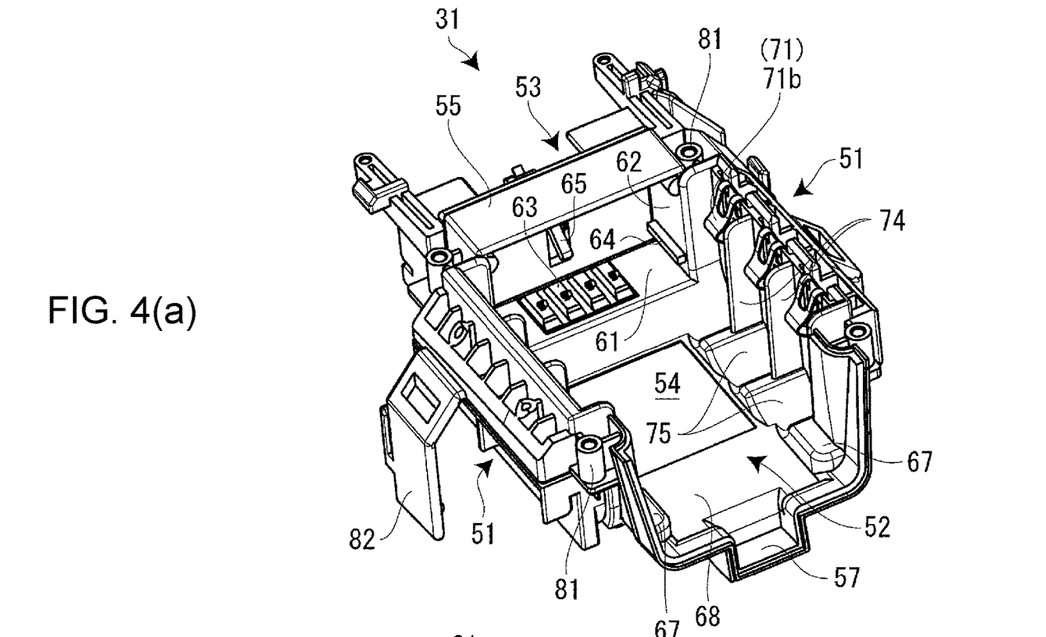
FIG. 4(a) is a perspective view of a battery housing portion as viewed obliquely from an upper left and FIG. 4(b) is a perspective view as viewed obliquely from an upper right.
Figure 4B:
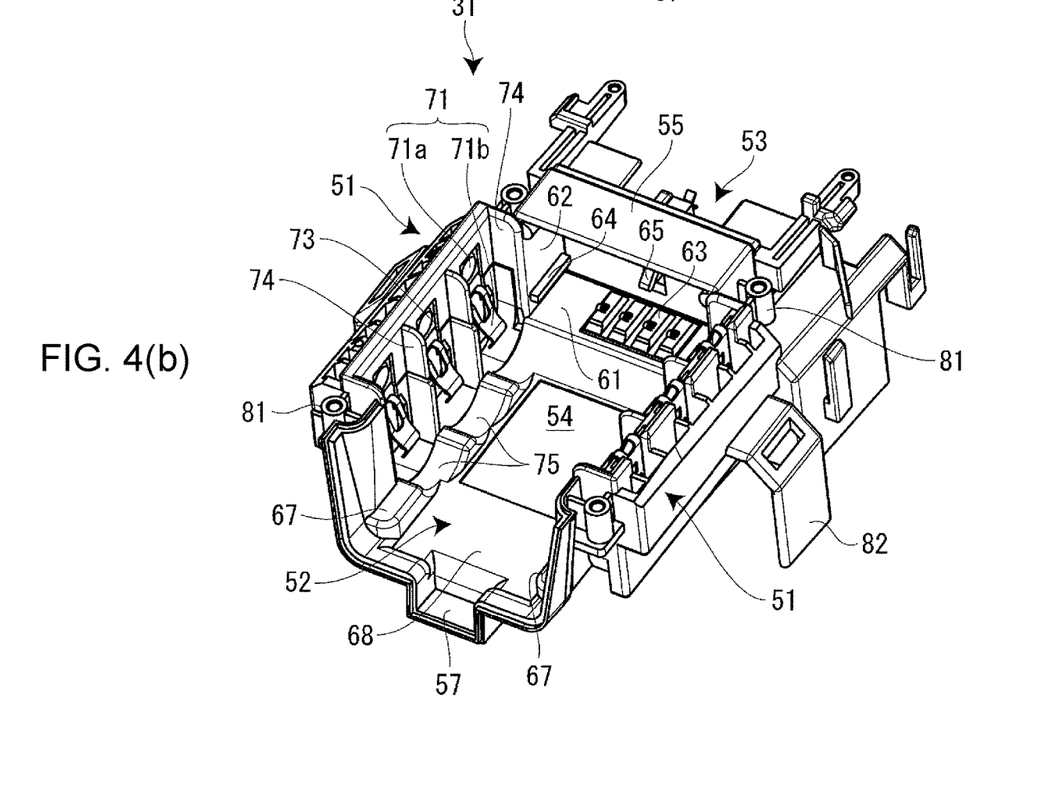
Figure 5B:
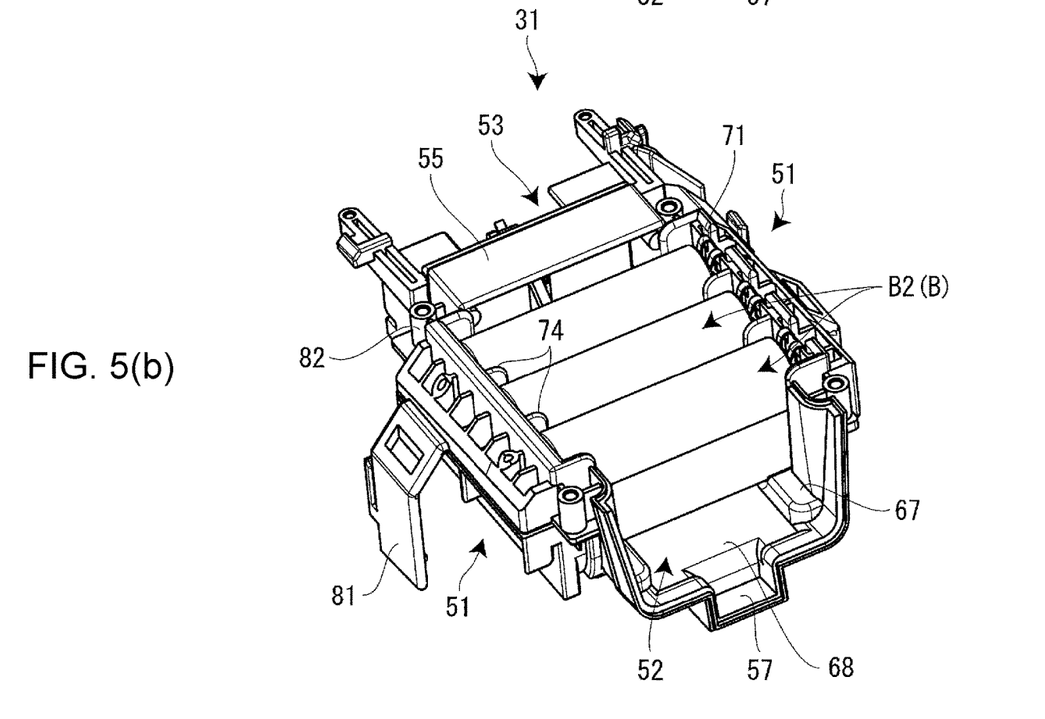

As described above, the battery housing portion 30 of the present embodiment is configured to be capable of mounting six dry batteries B2 in place of the rechargeable battery B1 and in a posture intersecting the mounting direction of the rechargeable battery B1 (see FIG. 5(*b*)). In this case, the six dry batteries B2 are mounted in three rows and two stages. Accordingly, on both side wall portions 51 (two peripheral walls), three dry battery terminals 71 (primary battery terminals) per each side wall portion, that is, a total of six dry battery terminals 71 are provided side by side. Each dry battery terminal 71 is integrally formed (series connection) with a protrusion-shaped positive terminal 71*a* and a leaf spring-shaped negative terminal 71*b*. In other words, on the side wall portion 51 on one side (left side), three dry battery terminals 71 are disposed side by side with the positive terminal 71*a* facing upward (FIG. 4(*b*)), and on the side wall portion 51 on the other side (right side), three dry battery terminals 71 are disposed with the negative terminal 71*b* facing upward (FIG. 4(*a*)).

In addition, the dry battery terminal 71 is disposed so as to be fitted into a longitudinally long shallow groove 73 formed on an inner surface of each side wall portion 51. In this case, the depth dimension of the shallow groove 73 is formed to be larger than the protruding dimension of the positive terminal 71*a*, so that the dry battery B2 which is mounted with an erroneous polarity is prevented from being electrically connected.

Each of the four protective partition walls 74, that is, a total of eight protective partition walls 74 which protect the left and right dry battery terminals 71 and are provided while being spaced by a gap corresponding to the width of the rechargeable battery B1 protrudes from both side wall portions 51. In other words, two protective partition walls 74 protrude from each of the side wall portions 51 so as to have three dry battery terminals 71 therein. In this case, the protruding dimension of the protective partition wall 74 is formed so that the protruding dimension of the positive terminal 71a is larger than the original protruding dimension of the negative terminal 71b.

In other words, the tip of the protective partition wall 74 protrudes beyond the tip of the negative terminal 71b. Accordingly, the rechargeable battery B1 does not interfere with the dry battery terminal 71 or the finger of the user or the like is not simply in contact with the dry battery terminal 71 (breakage prevention of dry battery terminal 71) when performing the attachment/detachment of the rechargeable battery B1. In addition, the tip of the protective partition wall 74 provided with a gap corresponding to the width of the rechargeable battery B1 also functions as an attachment/detachment guide of the rechargeable battery B1.

Three battery seating portions 75 are provided between the pedestal portion 61 and the battery support portion 67 described above in the bottom wall portion 52 which support both end portions of the lower stage dry battery B2 in the longitudinal direction. Each of the battery seating portions 75 is formed in an arc shape in conformity with the peripheral surface of the dry battery B2, and the three battery seating portions 75 are provided so as to be continuous in the far direction. Boss portions 81 for screwing the housing portion main body 31 to the device case 5 are provided at the four corners of the housing portion main body 31. In addition, a pair of hook portions 82 is provided on the outside surface of the side wall portion 51, and the pair of hook portions 82 locks so as to hold a power source substrate (not illustrated) disposed on the lower side of the battery housing portion 30 from both sides in the lateral direction (both, see FIG. 4).

As described above, according to the present embodiment, since the front surface opening portion 36 connected to the top surface opening portion 35 reaches the bottom surface 68 of the housing portion main body 31, a finger can be easily disposed on a lower side of the housed battery B (rechargeable battery B1 and dry battery B2) and the battery B can be simply detached from the housing portion main body 31, through the front surface opening portion 36. In other words, the front surface opening portion 36 is largely opened to the outside portion in a state where the battery lid 33 is removed similarly to the top surface opening portion 35, and when performing the attachment/detachment of the battery B, complicated detachment operation such as insertion of a finger into a narrow space is not required. Therefore, the attachment/detachment of the battery B can be easily performed with respect to the housing portion main body 31.

Particularly, since the mounted rechargeable battery B1 is supported by the pair of battery support portions 67 so as to generate a floating space 69 continuing to the recessed portion 57, the attachment/detachment of the rechargeable battery B1 can be easily performed. In addition, the front surface opening portion 36 and the finger insertion space 6 of the handle portion 4 can function as approximate mounting guides in the attachment/detachment of the rechargeable battery B1 and the handle portion 4 can function as a dropping prevention component of the pulled out rechargeable battery B1.

As long as the finger hook on the battery B is not hindered, the lower end of the front surface opening portion 36 may protrude slightly from the bottom surface 68 of the housing portion main body 31. Similarly, the width of the front surface opening portion 36 may be narrower than that of the embodiment as long as the finger hook on the battery B is not hindered.

REFERENCE SIGNS LIST 1 tape printing device
4 handle portion
5 device case
6 finger insertion space
13 printing portion
30 battery housing portion
31 housing portion main body
32 opening portion
33 battery lid
35 top surface opening portion
36 front surface opening portion
41 top surface covering portion
42 front surface covering portion
51 side wall portion
52 bottom wall portion
53 far wall portion
55 eaves-like plate portion
61 pedestal portions
63 rechargeable battery terminal
64 guide protrusion
67 battery support portion
68 bottom surface
69 floating space
71 dry battery terminal
71a positive terminal
71b negative terminal
73 shallow groove
74 protective partition wall
B battery
B1 rechargeable battery
B2 dry battery

The invention claimed is:

1. An electronic device comprising:
a battery housing portion, wherein the battery housing portion includes
a housing portion main body and
a lid body which covers an opening portion of the housing portion main body,
wherein the opening portion includes
a top surface opening portion which faces a bottom surface of the housing portion main body, and
a peripheral surface opening portion which is formed on one peripheral wall of four peripheral walls intersecting the bottom surface of the housing portion main body, continues to the top surface opening portion, and reaches the bottom surface or the vicinity of the bottom surface,
wherein the battery housing portion is configured to mount a secondary battery,
wherein the housing portion main body includes
a secondary battery terminal which is positioned on a terminal surface of the housing portion main body and is configured to extract electric power from the secondary battery that is mounted through the peripheral surface opening portion,
a pair of guide portions which are configured to engage with guide grooves of the secondary battery and are configured to receive an urging force from the secondary battery terminal, and
a terminal protection portion that faces the secondary battery terminal and is at least partially aligned with and spaced apart from the terminal surface such that the terminal protection portion and the terminal surface are configured to extend along opposite sides of the secondary battery, wherein the terminal protection portion is configured to prevent the secondary battery from being mounted through the top surface opening portion.

2. The electronic device according to claim 1,
wherein the lid body includes a top surface covering portion which covers the top surface opening portion and a peripheral surface covering portion which covers the peripheral surface opening portion, and
wherein the lid body opens and closes the opening portion in a snap-in manner.

3. The electronic device according to claim 1,
wherein the housing portion main body includes a pedestal portion that provides the terminal surface and the secondary battery terminal and a pair of battery support portions that extends in the mounting direction of the secondary battery and along the peripheral surface opening portion, and the pedestal portion and the pair of battery support portions configure a gap between the secondary battery and the bottom surface of the housing portion main body, wherein the gap extends along the peripheral surface opening portion.

4. The electronic device according to claim 1, further comprising:
a handle portion which includes a finger insertion space facing the peripheral surface opening portion and supports the electronic device, and
wherein a length of the finger insertion space is shorter than a length of the secondary battery in the mounting direction of the secondary battery.

5. The electronic device according to claim 1,
wherein the battery housing portion is configured to mount a primary battery in a posture orthogonal to the mounting direction of the secondary battery in place of the secondary battery, and
wherein the housing portion main body includes a primary battery terminal that is configured to extract electric power from the primary battery that is mounted through the top surface opening portion.

6. The electronic device according to claim 5,
wherein the length of the secondary battery in the direction intersecting the mounting direction is formed to be shorter than the length in the mounting direction of the primary battery,
wherein the primary battery terminal is provided on the other two peripheral walls intersecting one peripheral wall, and
wherein a protective partition wall which protects the primary battery terminal protrudes from the other two peripheral walls spaced by the width of the secondary battery.

7. The electronic device according to claim 6,
wherein a positive side terminal of the primary battery terminal is provided in a shallow groove recessed in the other peripheral walls.

8. The electronic device according to claim 1, further comprising:
a printing portion which prints on a printing tape,
wherein the printing portion is held and operated.

9. The electronic device according to claim 2, further comprising:
a printing portion which prints on a printing tape,
wherein the printing portion is held and operated.

10. The electronic device according to claim 3, further comprising:
a printing portion which prints on a printing tape,
wherein the printing portion is held and operated.

11. The electronic device according to claim 4, further comprising:
a printing portion which prints on a printing tape,
wherein the printing portion is held and operated.

12. The electronic device according to claim 5, further comprising:
a printing portion which prints on a printing tape,
wherein the printing portion is held and operated.

13. The electronic device according to claim 6, further comprising:
a printing portion which prints on a printing tape,
wherein the printing portion is held and operated.

14. The electronic device according to claim 7, further comprising:
a printing portion which prints on a printing tape,
wherein the printing portion is held and operated.

15. The electronic device according to claim 1, wherein the battery housing portion is configured to mount a primary battery through the top surface opening portion and the secondary battery through the peripheral surface opening portion in place of the primary battery, wherein the housing portion main body includes a primary battery terminal for the primary battery, wherein the primary battery terminal is positioned on the other two peripheral walls intersecting one peripheral wall.

* * * * *